United States Patent
McKeon et al.

(10) Patent No.: US 10,466,384 B2
(45) Date of Patent: Nov. 5, 2019

(54) TECHNIQUES FOR DETERMINING FORMATION COMPOSITION FROM MEASURED NUCLEAR SPECTRA

(71) Applicant: Weatherford Technology Holdings, LLC, Houston, TX (US)

(72) Inventors: Donald McKeon, Grosse Pointe Park, MI (US); Richard R. Pemper, Sugar Land, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 15/860,293

(22) Filed: Jan. 2, 2018

(65) Prior Publication Data

US 2019/0204471 A1   Jul. 4, 2019

(51) Int. Cl.
*G01V 5/10* (2006.01)
*G01V 5/08* (2006.01)

(52) U.S. Cl.
CPC ............... *G01V 5/101* (2013.01); *G01V 5/08* (2013.01); *G01V 5/10* (2013.01); *G01V 5/104* (2013.01)

(58) Field of Classification Search
CPC . G01V 5/101; G01V 5/08; G01V 5/10; G01V 5/104
See application file for complete search history.

(56) References Cited

U.S. PATENT DOCUMENTS

| | | | |
|---|---|---|---|
| 7,205,535 B2 | 4/2007 | Madigan et al. | |
| 7,366,615 B2 | 4/2008 | Herron et al. | |
| 9,012,836 B2 | 4/2015 | Wilson et al. | |
| 9,702,990 B2 | 7/2017 | Mickael | |
| 2006/0033023 A1* | 2/2006 | Pemper | G01N 33/24 250/269.6 |
| 2010/0312479 A1* | 12/2010 | Khisamutdinov | E21B 47/1015 702/8 |

OTHER PUBLICATIONS

Aboud, Manuel, et al., "High-Definition Spectroscopy— Determining Mineralogic Complexity," Schlumberger Oilfield Review, Spring 2014, 26, No. 1, 17 pages.

Galford, James, et al., "A New Neutron-Induced Gamma-Ray Spectroscopy Tool for Geochemical Logging," SPWLA 50$^{th}$ Annual Logging Symposium, Jun. 21-24, 2009, 14 pages.

(Continued)

*Primary Examiner* — Michael C Bryant
(74) *Attorney, Agent, or Firm* — Lewis & Reese, PLLC

(57) ABSTRACT

Systems and methods for determining the composition of an earth formation are disclosed. One or more spectra that correspond to gamma radiation that is detected at each of multiple depths in a wellbore are generated, the contributions of each of multiple detection elements to the one or more spectra are determined, and the weight fractions of each of multiple compounds that are associated with the detection elements are calculated. The weight fraction calculations are based on a number density ratio value for the compound's associated detection element, which allows the weight fraction to be calculated directly from the contribution of the compound's associated detection element without a normalization factor.

11 Claims, 6 Drawing Sheets

(56) References Cited

OTHER PUBLICATIONS

Hertzog, R., et al., "Geochemical Logging with Spectrometry Tools," Society of Petroleum Engineers, Jun. 1989, 10 pages.
Hertzog, R.C., "Laboratory and Field Evaluation of an Inelastic Neutron Scattering and Capture Gamma Ray Spectrometry Tool," Society of Petroleum Engineers, Schlumberger-Doll Research Center, Oct. 1980, 14 pages.
Pemper, Richard, et al., "A New Pulsed Neutron Sonde for Derivation of Formation Lithology and Mineralogy," Society of Petroleum Engineers—2006 Annual Technical Conference and Exhibition, Sep. 24-27, 2006, 13 pages.
Radtke, R. J., et al., "A New Capture and Inelastic Spectroscopy Tool Takes Geochemical Logging to the Next Level," SPWLA 53$^{rd}$ Annual Logging Symposium, Jun. 16-20, 2012, 16 pages.
Stoller, C., et al., "Use of LaBr$_3$ for Downhole Spectroscopic Applications," IEEE Nuclear Science Symposium Conference Record, 2011, 5 pages.

* cited by examiner

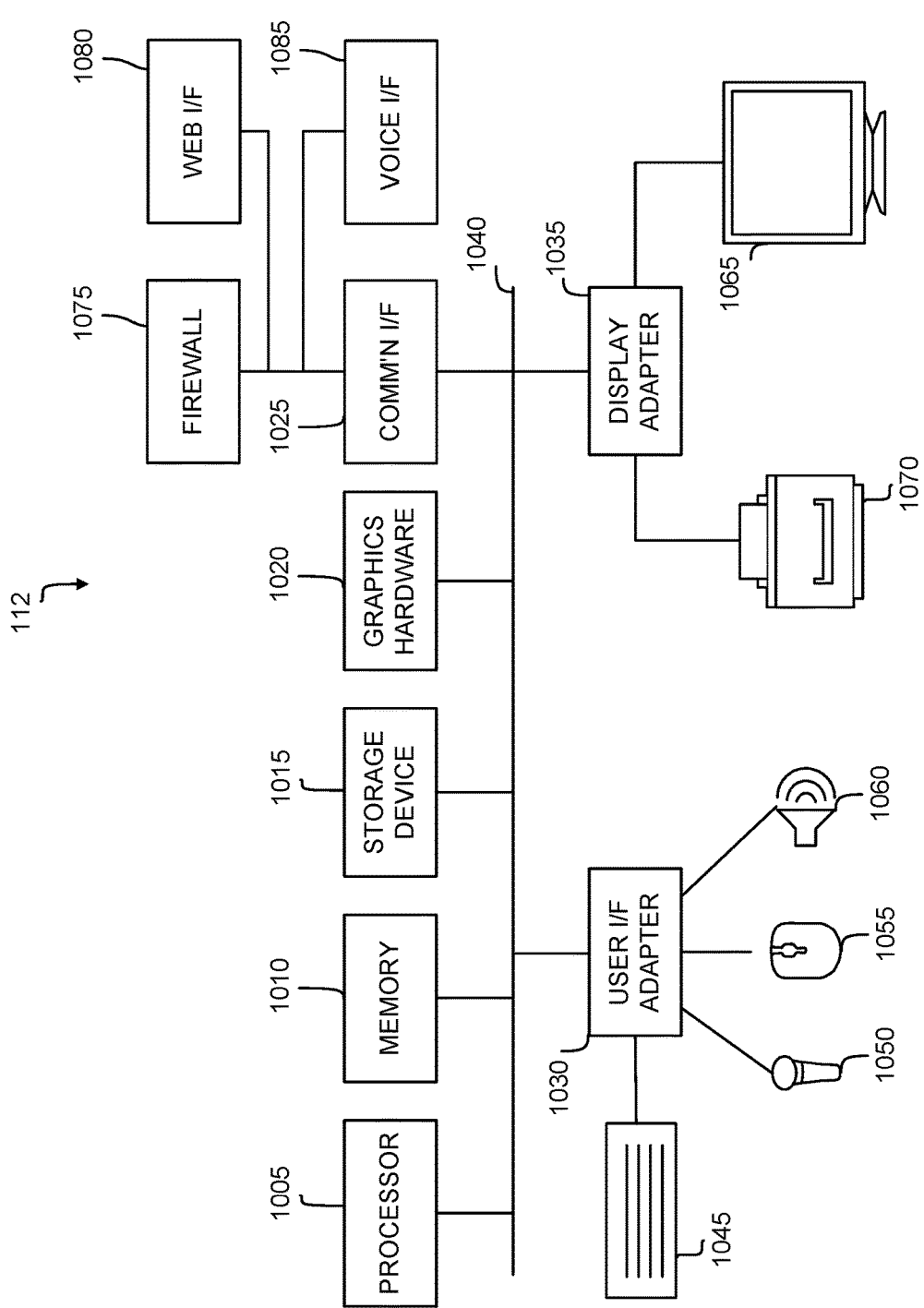

TECHNIQUES FOR DETERMINING FORMATION COMPOSITION FROM MEASURED NUCLEAR SPECTRA

FIELD OF THE TECHNOLOGY

The present application relates to techniques for determining the formation composition from nuclear spectroscopy measurements.

BACKGROUND

For many years, nuclear spectroscopy has been utilized as a tool to differentiate between different lithologies, mineralogies, densities, and porosities of subterranean geological formations. In particular, naturally-occurring gamma radiation has been measured within wellbores to derive valuable information regarding the possible location of formations containing desired natural resources (e.g., oil and natural gas, etc.) and induced gamma radiation has been measured within wellbores to derive formation density, fluid-filled porosity, and formation mineralogy. The present application is related to techniques for determining the weight fraction of various compounds in a geological formation directly from elemental count rates that are determined from spectra generated by a neutron logging tool.

BRIEF DESCRIPTION OF THE DRAWINGS

FIG. 10 is a block diagram of a processing system that may be configured to implement at least some portions of the process for determining formation compound weight percentages directly from the elemental count rates determined from spectra generated by the neutron logging tool in accordance with an embodiment of the disclosure.

DETAILED DESCRIPTION

Figure 1:
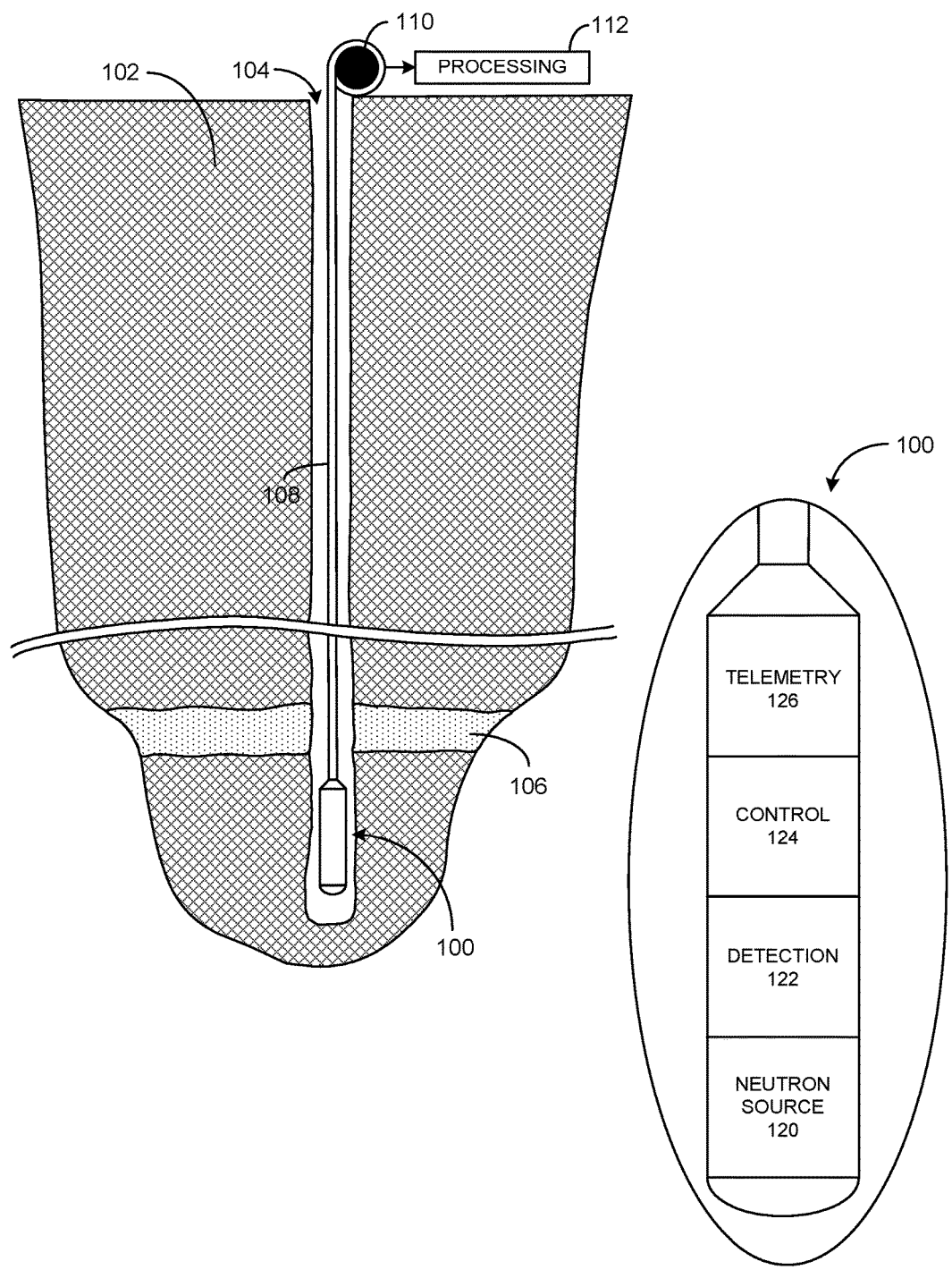
FIG. 1 shows an overview of the various components associated with the deployment of a neutron logging tool in a wellbore in accordance with an embodiment of the disclosure.

FIG. 1 illustrates a neutron logging tool 100 used for obtaining induced gamma radiation measurements relating to the geological formation 102 adjacent to a wellbore 104. Such measurements provide valuable information regarding natural resources that may be located at various depths along the wellbore 104. For example, measurements that are recorded when the tool 100 is adjacent to the region 106 may indicate that it is likely to contain desirable natural resources. In the illustrated embodiment, the tool 100 is conveyed within the wellbore 104 by a wireline logging cable 108 that is connected to draw works 110 and a processing system 112 at the surface. The wireline logging cable 108 supports the weight of the tool 100 and acts as a data conduit between the processing system 112 and the tool 100. While the tool 100 is illustrated as being conveyed via wireline 108, it will be understood that the tool 100 could also be conveyed into the wellbore 104 in other ways such as via coiled tubing, drill string (e.g., during a logging while drilling operation), etc.

The tool 100 includes a neutron source section 120, a detection section 122, a control section 124, and a telemetry section 126. The neutron source section 120 includes a neutron source 130 that bombards the formation adjacent the tool 100 with high energy neutrons (e.g., 14 MeV). The neutron source 130 is preferably a pulsed neutron generator, which enables the precisely timed emission of neutrons, but it may also be a chemical neutron source such as an Americium-Beryllium source. The detection section 122 includes one or more detectors that detect gamma radiation that is emitted as a result of interactions between emitted neutrons and the nuclei of formation elements. Control section 124 includes control circuitry that controls the operation of the neutron source section 120, detection section 122, and telemetry section 126. The telemetry section 126 includes modulation and demodulation circuitry for sending and receiving electrical signals to and from a remote device such as the processing system 112 (e.g., via wireline 108).

Figure 2:
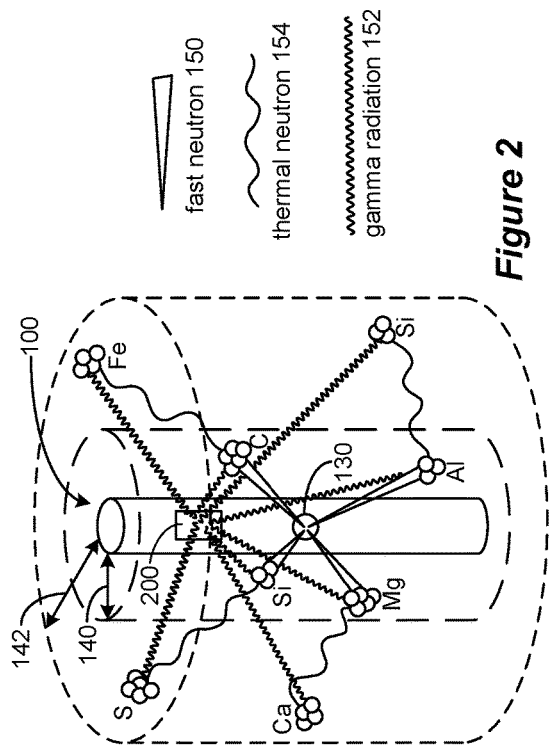
FIG. 2 shows different types of interactions between neutrons emitted by the neutron logging tool and the nuclei of neighboring elements that are detectable by the tool in accordance with an embodiment of the disclosure.

FIG. 2 provides a simplified view of the interactions between neutrons emitted by the tool 100 and the nuclei of neighboring atoms in the formation. Nearer to the neutron source 130 (e.g., within the radius 140), fast-moving neutrons 150 are scattered through inelastic and elastic collisions with the nuclei of atoms in the formation. When inelastic scattering occurs, a portion of the neutron's kinetic energy is transferred to the nucleus of the atom with which it collides, decreasing the energy of the neutron. Often, at least a portion of the energy transferred from the incident neutron to the atom's nucleus briefly activates the nucleus to an unstable, excited state. When the nucleus transitions back to a stable, ground state, it may emit gamma radiation 152 with energy that is characteristic of the atom. As the neutrons move away from the neutron source 130 (e.g., outside of the radius 140 and within the radius 142) and continue to lose energy, they reach thermal equilibrium with the surrounding medium. These "thermal neutrons" 154 will eventually be absorbed by the nuclei of neighboring atoms, resulting in new isotopes of the atoms. The absorption of a thermal neutron often results in the emission of gamma radiation 152 with energy that is again characteristic of the atom that absorbed the neutron. The different elements that interact with neutrons in the ways shown in FIG. 2 are described as "detection elements" because the gamma radiation that they produce is detectable and can be attributed to the type of element that resulted in the gamma radiation as described below.

Gamma radiation refers generally to high-energy electromagnetic radiation having an energy level that exceeds 100,000 electron Volts (100 keV). Gamma radiation 152 that is emitted as a result of the above-described neutron interactions (as well as naturally-occurring gamma radiation) generally has an energy between 100 keV and 10 MeV and is detected by one or more gamma radiation detectors 200 in the tool's 100 detection section 122. Each detector 200 may be placed near the periphery of the tool 100 to minimize the distance between the detector 200 and the gamma radiation source, i.e., the formation 102 traversed by the wellbore 104.

Figure 3:
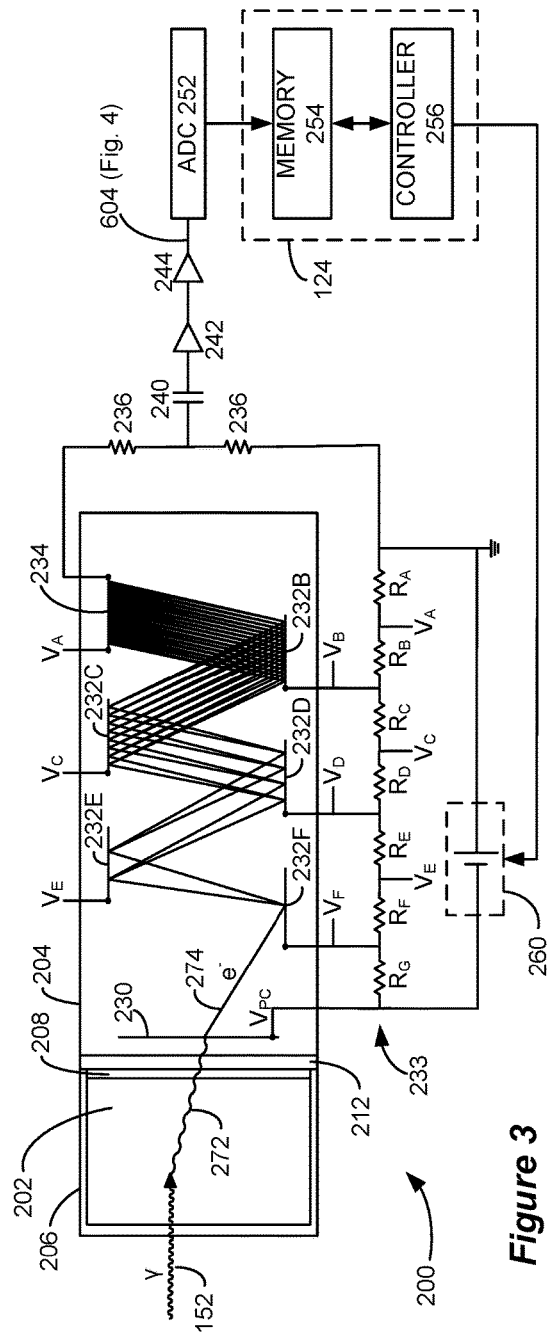
FIG. 3 shows various components of a gamma radiation detector in the neutron logging tool in accordance with an embodiment of the disclosure.

FIG. 3 shows an example detector 200 that includes a scintillation crystal 202 and a light sensor 204 (i.e., a photomultiplier tube (PMT)). The scintillation crystal 202 may be formed from materials that exhibit desirable scintillation properties upon interaction with gamma radiation such as lanthanum bromide ($LaBr_3$), sodium iodide doped with thallium (NaI(Tl)), cesium iodide doped with thallium or sodium (CsI(Tl) or CsI(Na)), bismuth germanate (BGO), or other organic or inorganic materials. An incoming gamma radiation photon 152 traverses the crystal 202's light-reflective housing 206 (which is only reflective to lower-energy photons) and interacts with the scintillation crystal 202, which causes the emission of a larger number of lower-energy photons 272. (e.g., ultraviolet or visible light) as excited atoms in the crystal 202 return to the ground state. The lower-energy photons 272 have an energy content that is generally proportional to the energy of the gamma radiation photon 152.

Because the crystal 202 is surrounded by the light-reflective housing 206, the resulting photons 272 can only escape the crystal 202 through the transparent cover 208, which is optically coupled to the PMT 204. The PMT 204 is an evacuated tube containing a photocathode 230, several dynodes 232, and an anode 234 within a glass housing. The photocathode 230 is held at a high negative voltage $V_{PC}$ that is supplied from a power supply 260, and the anode 234 is held at voltage $V_A$ which may be near a ground potential. The dynodes 232 form a voltage gradient between $V_{PC}$ and $V_A$ with each of the dynodes 232 being held at a higher potential than the node preceding it (i.e., $V_{PC} < V_F < V_E \ldots < V_B < V_A$). The voltage differential between $V_{PC}$ and $V_A$ may be on the order of 900 to 1100 Volts. The distributed voltages are created by a voltage divider circuit 233 including a number of resistors, which may be of equal value. It should be noted that the actual PMT 204 might include more dynodes 232 than shown in FIG. 3. Although not illustrated, electronic circuitry 250 may include one or more capacitors across the dynodes 232 to help stabilize their voltages as electrons propagate through the PMT 204.

As the photons 272 exit the crystal 202 through the cover 208, they strike the photocathode 230, which is a conductive, photosensitive coating that is applied to the surface of the PMT adjacent to the cover 208. Upon the arrival of the photons 272, a small group of primary electrons 274 is ejected from the surface of the photocathode 230 as a consequence of the photoelectric effect. The primary electrons 274 leave the photocathode 230 with an energy equal to the incoming photons 272 less the work function of the photocathode 230. Due to the geometric arrangement of the dynodes 232 and the manner in which they are biased, the primary electrons 274 are accelerated toward the first dynode 232F, increasing their kinetic energy. Upon striking the dynode 232F, the increased-energy primary electrons 274 cause the emission of a greater number of lower-energy secondary electrons, which are in turn accelerated toward the next dynode 232E. This process continues and results in an exponential increase in the number of electrons that arrive at the anode 234.

The large number of electrons arriving at the anode 234 produces an electrical pulse, which is measured by circuitry in the detector 200. Voltage-divider resistors 236 are sized to decrease the voltage at the anode 234 containing the pulse. A DC-blocking capacitor 240 removes the DC component of this decreased voltage signal, such that only the AC portion of the voltage signal caused by the pulse (and ultimately by the gamma radiation photon 152) is passed for further processing. This AC voltage signal is preferably pre-processed by a preamplifier 242 and further amplified by an amplifier 244. The amplifier 244 may further shape the electrical signal, for example, by generating a biphasic pulse with a shortened decay time.

Figure 4:
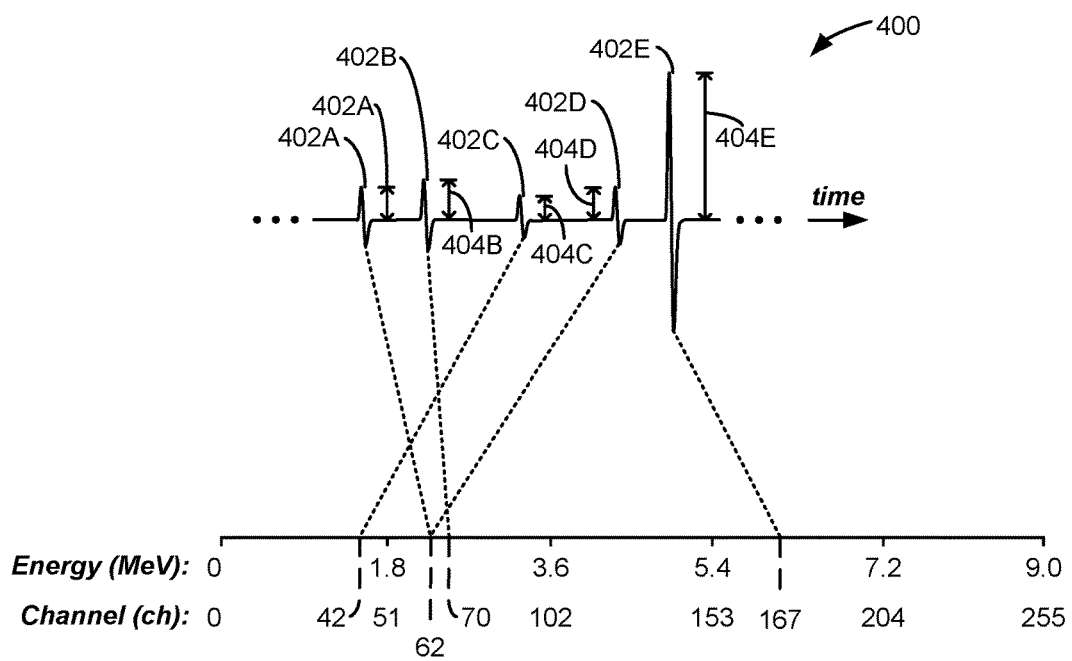
FIG. 4 shows a sequence of electrical pulses that correspond to the detection of various gamma radiation photons by the gamma radiation detector in accordance with an embodiment of the disclosure.

FIG. 4 illustrates a stream of pulses 400 generated by the amplifier 244 in response to the detection of various gamma radiation photons 152 by the detector 200. As a result of the detection physics involved, the magnitude 404 of each pulse 402A-E is proportional to the energy of its associated gamma radiation photon 152.

Figure 5:
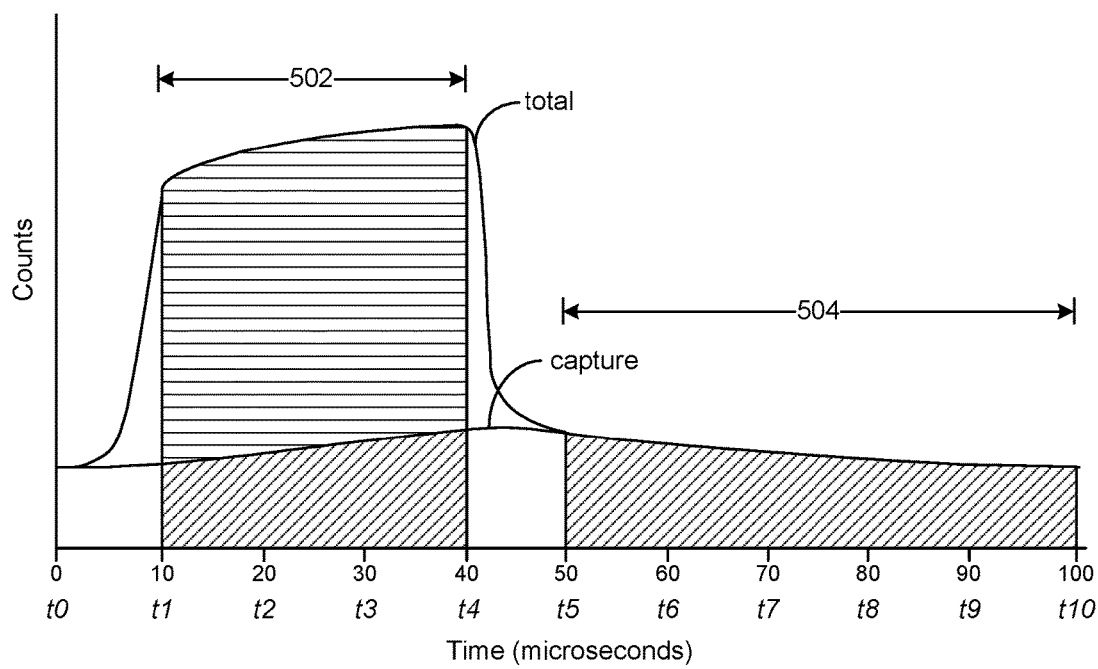
FIG. 5 shows an example of the number of gamma radiation photons that are detected during a neutron pulse cycle in accordance with an embodiment of the disclosure.

FIG. 5 shows an example of the total number of detected gamma radiation photons 152 (of various different energy levels) that are observed during the course of a single neutron pulse cycle as well as the number of those total photons that are emitted as a result of a neutron capture interaction. In the illustrated example, the neutron source 130 is pulsed at 10 kHz, so each detection cycle lasts 100 microseconds. When the neutron source 130 pulse begins at t0, the tool's 100 one or more detectors 200 continue to observe gamma radiation photons that are emitted as a result of neutron capture interactions associated with neutrons that were emitted during the previous neutron pulse.

Between t0 and t1, gamma radiation detected by the detectors 200 sharply increases, primarily as a result of inelastic collisions between the emitted neutrons and the nuclei of formation atoms. The one or more detectors 200 are synchronized with the source 130, and between times t1 and t4 (interval 502), the pulses 402 are digitized by an Analog-to-Digital converter (ADC) 252 (FIG. 3), and the digitized pulses, or at least their magnitudes 404, are stored in a memory 254. The digitized magnitudes 404 enable each gamma radiation photon observed by the detector 200 to be sorted into a channel based on the photon's energy. In the example shown in FIG. 4, the full 0-9 MeV detection energy range is divided into 256 channels each having an energy range of approximately 35 keV although other numbers of channels (e.g., 1024) with different energy resolutions may also be used.

Between t4 and t5, gamma radiation sharply declines as inelastic collisions decrease to near zero (i.e., as emitted neutrons lose the energy required for inelastic interactions or move to a distance from the detectors 200 at which such interactions are not easily detectable), and, during this time period, no pulses 402 are stored in the memory 254. Between t5 and t10 (interval 504), the observed gamma radiation is caused almost exclusively by neutron capture interactions, and the magnitudes 404 of digitized pulses are again stored in the memory 254.

The digitized magnitudes 404 for the pukes 402 detected within the intervals 502 and 504 are provided from memory 254 to a controller 256 (e.g., a microprocessor, a microcontroller, a FPGA, or other logic circuitry). From the data corresponding to the intervals 502 and 504, the controller 256 generates a raw total spectrum and a raw capture spectrum, respectively. Although a single neutron pulse cycle is illustrated in FIG. 4, the data utilized to generate the raw spectra is typically collected across multiple neutron pulse cycles. The number of cycles included in the spectra is dependent upon the rate at which the tool 100 is conveyed through the wellbore 104 and the desired spectral resolution increment (i.e., the depth interval over which a spectrum will be generated).

Essentially, the raw total spectrum comprises a histogram in which each pulse 402 recorded within the interval 502 increments a count of a particular channel based on its magnitude 404. Similarly, the raw capture spectrum is essentially a histogram based on the pulses within the interval 504. Each spectrum specifies a quantity of the detected gamma radiation that is within each of a plurality of energy ranges. Although not illustrated, some portion of the gamma radiation detected by the tool 100 may result from background (i.e., naturally-occurring) radiation and/or interactions of emitted neutrons with atoms in a borehole fluid or wellbore conduit (e.g., casing). The raw total and capture spectra are processed by the controller 256 to remove these effects.

Figure 6:
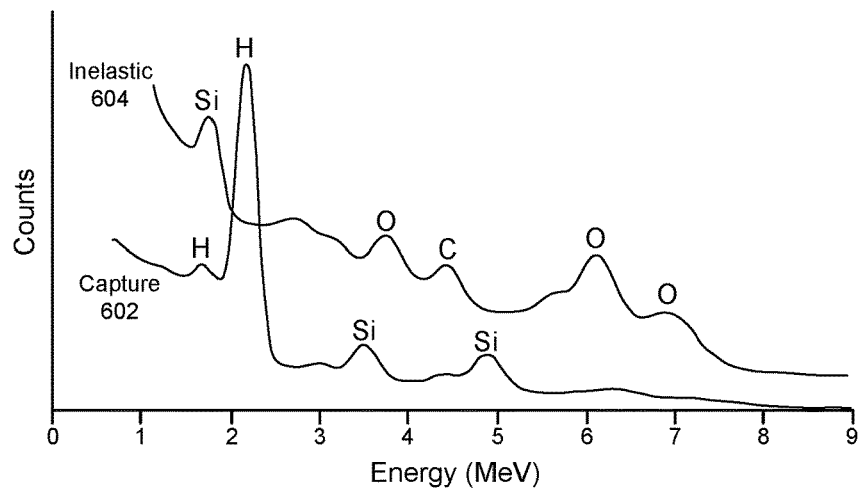
FIG. 6 shows example inelastic and capture spectra generated by the neutron logging tool in accordance with an embodiment of the disclosure.

The resulting processed capture spectrum 602 is shown in FIG. 6. The inelastic spectrum 604 is generated by subtracting an adjusted version of the capture spectrum 602 (e.g., the capture spectrum 602 multiplied by an experimentally-determined factor to account for the difference in estimated detectable capture interactions in the intervals 502 and 504) from the processed total spectrum. The capture and inelastic spectra 602 and 604 may be generated at approximately 1/10 meter intervals as the tool 100 is conveyed through the wellbore 104, although other internals might also be utilized. The tool's 100 control section 124 typically causes the telemetry section 126 to communicate digital data representative of the generated capture and inelastic spectra to the processing system 112. The tool's 100 depth, which is recorded by the draw works 110, may also be communicated to the processing system 112 and associated with the received spectra. While generation of the inelastic and capture spectra has been described as being performed by the tool 100, in another embodiment, the spectra may be generated at a remote device such as processing system 112. In such an embodiment, the controller 256 may either transmit the digitized pulse values to the remote device or store them for transfer to the remote device after retrieval of the tool 100 from the wellbore 104.

As described above, the gamma radiation that is detected by the tool 100 is caused by interactions between emitted neutrons and formation atoms, which interactions result in the emission of gamma radiation having an energy that is unique to the atom involved in the interaction. Therefore, the capture and inelastic spectra 602 and 604 carry information regarding the elemental composition of the formation. In order to extract this information, it is assumed that each spectrum is composed of a linear combination of the spectra of individual detection elements, and the contribution of each of the detection elements to the capture and/or inelastic spectra is determined. For example, it is assumed that a generated capture spectrum is composed of a linear combination of the example elemental capture spectra shown in FIG. 7 and the inelastic spectrum is composed of a linear combination of the example elemental inelastic spectra shown in FIG. 8. FIG. 6 shows the contributions of some of the major peaks of different elemental spectra to the capture and inelastic spectra 602 and 604.

Figure 7:
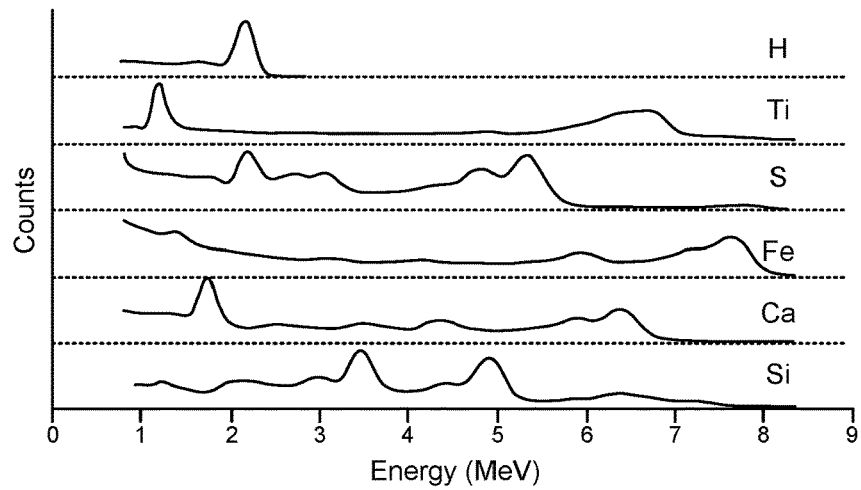
FIG. 7 shows various characteristic elemental capture spectra that contribute to the combined capture spectrum generated by the neutron logging tool in accordance with an embodiment of the disclosure.
Figure 8:
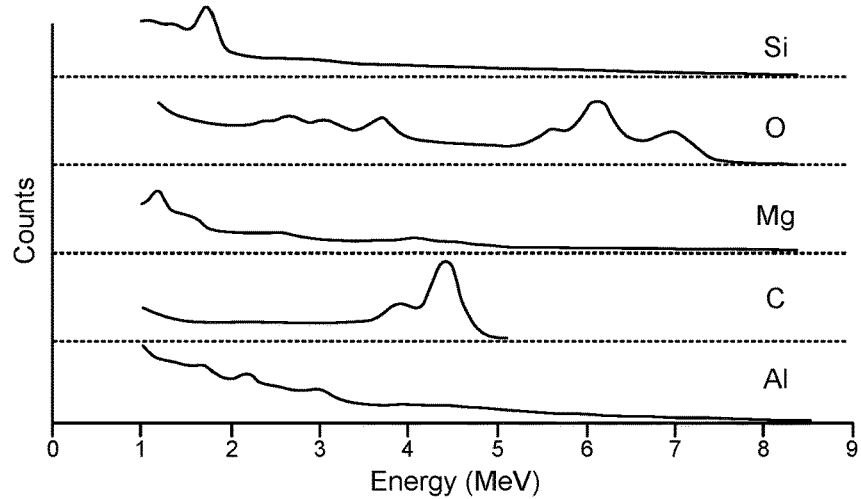
FIG. 8 shows various characteristic elemental inelastic spectra that contribute to the combined inelastic spectrum generated by the neutron logging tool in accordance with an embodiment of the disclosure.

The elemental capture and inelastic spectra may be determined for the particular type of tool 100 by measuring the response of the tool 100 to samples of known content (e.g., a sample substantially including a single one of the detection elements). For example, the silicon and calcium elemental spectra. (both capture and inelastic in the case of silicon) may be determined by measuring the tool's 100 response to clean sandstone ($SiO_2$) and limestone ($CaCO_3$) formations, respectively. The elemental spectra may alternatively be determined for the particular type of tool based on one or more Monte Carlo simulations. While several example elemental spectra are illustrated in FIGS. 7 and 8, it will be understood that standard spectra for additional elements may be developed and utilized in determining their contribution to the measured spectra.

The combination of elemental spectra that most closely matches a measured spectrum can be determined by solving for the set of elemental yields that minimizes the error in the following mathematical expression:

$$m = \sum_{i=1}^{a} \sum_{j=1}^{b} (y_j s_{ij} + e_i) \qquad \text{Eq. 1}$$

where
  m=measured and processed spectrum;
  i=channel number;
  j=element number;
  a=number of channels in the spectrum;
  b=number of elements included in the combination;
  $y_j$=yield of element j;
  $s_{ij}$=number of counts (or count rate) for the ith channel of element j's elemental spectrum; and
  $e_i$=error for channel i for a given set of elemental yields.

Equation 1 can be solved to minimize the error over the full range of channels for both the measured inelastic and capture spectra.

The calculated elemental yields (which can also be expressed as elemental count rates) are illustrative of the relative contributions of the various elements to the measured spectra, but the elemental yields must be converted to weight fractions to derive more meaningful information. This is because the probability that a neutron will interact with an element and emit a detectable gamma radiation photon as a result of such interaction is element-specific. As a result, a higher elemental yield may be indicative of a higher probability of a detectable interaction as opposed to a higher concentration of an element in the formation.

If neutron flux through the formation was constant at all depths within the wellbore 104, then computing the elemental weight fraction from the elemental yield would simply involve adjusting the elemental yield based on an element-specific sensitivity factor that accounts for the tool's 100 relative sensitivity in detecting the interactions of various elements. However, several factors, including formation porosity, formation and borehole salinity, and borehole size, affect neutron flux such that neutron flux is not constant at different wellbore depths. Therefore, the current standard technique for converting elemental yields to elemental weight fractions relies upon a depth-dependent normalization factor to account for variations in neutron flux. This model, known as the oxides closure model, assumes that the various elements exist as an oxide or carbonate and that the weight fractions of such oxides and carbonates sum to one. The oxides closure model is based on the following equation:

$$F\left(\sum_{j=1}^{b} X_j \frac{y_j}{S_j}\right) = 1 \qquad \text{Eq. 2}$$

where

F=depth-dependent normalization factor;

$X_j$=ratio of the weight of the oxide or carbonate associated with element j to the weight of element j in the oxide or carbonate; and $S_j$=tool sensitivity to interactions involving element j.

The depth-dependent normalization factor, F, is applied at each depth to ensure that the weight fractions sum to one. Each oxide or carbonate weight fraction, $WF_{compound}$, is then given by:

$$WF_{compound} = F * X_j * \frac{y_j}{S_j} \qquad \text{Eq. 3}$$

The inventors have devised a technique for calculating the weight fractions of formation compounds associated with the detection elements directly from the contribution of the compound's associated detection element to the spectra without a normalization factor. Thus, the weight fractions of formation compounds can be determined directly from elemental count rates regardless of varying wellbore and formation properties. This technique is computationally simpler and more accurate than the traditional oxides closure method. It should be noted that in some cases, relative yields can be used in place of absolute count rates.

The improved technique is derived from elemental number densities (i.e., the quantity of atoms of a particular element in a given volume). More specifically, the technique is derived from the inventors' discovery that the ratio of an element's count rate per number density to a reference element's count rate per number density (i.e., the element's number density ratio) is constant regardless of wellbore and formation properties. Below is the equation that sets forth this relationship.

$$\frac{\frac{CR_j}{N_j}}{\frac{CR_{ref}}{N_{ref}}} = \omega_j = \text{constant} \qquad \text{Eq. 4}$$

where $CR_j$=elemental count rate for element j;

$N_j$=elemental number density for element j;

$CR_{ref}$=elemental count rate for the reference element; and $N_{ref}$=elemental number density for the reference element.

Physically, while the thermal neutron flux depends on the location in the formation relative to the neutron source, the ratio of the neutron capture rate for one element to another element is the same at any position in the formation (assuming a uniform elemental concentration over a several foot interval, which is a general assumption in well logging analysis). The rate of capture for an element is $$R_j = N_j \cdot \sigma_j \cdot \phi \qquad \text{Eq. 5}$$

where $\sigma_j$ is the microscopic capture cross section for the element j, $\phi$ is the thermal neutron flux and $R_j$ is the capture rate (#/s) for the element j. When taking the ratio of the capture rate between two elements a and b, the neutron flux cancels and the ratio of capture rates is $$\frac{R_a}{R_b} = \frac{N_a}{N_a} \cdot \frac{\sigma_a}{\sigma_b} \qquad \text{Eq. 6}$$

anywhere in the formation.

Another discovery is that the ratio of the probability of gamma ray detection for one element to another element is approximately constant in the formation. This is because the gamma rays of interest are typically above 0.7 MeV and that many elements have a spectrum of high energy gamma rays. High energy gamma rays can penetrate relatively long distances in the formation, and differences in the detection probabilities between high energy gamma rays from one element to another are small.

Therefore, the detector count rate can be given by $$CR_j = N_j \cdot \sigma_j \cdot \phi \cdot P_{emission,j} \cdot P_{detection,j} \qquad \text{Eq. 7}$$

where $P_{emission,j}$ is the probability of emitting a gamma ray(s) due to capture, and $P_{detection,j}$ is the probability of detection for gamma rays from element j. For thermal neutrons, the emission probabilities are constant, and the ratio of detection probabilities for gamma rays of interest is nearly constant.

These discoveries indicate that there is a direct relationship between the measured count rates of individual elements that is independent of wellbore and formation properties, and therefore it is possible to derive an equation based on elemental number densities that does not require a normalization factor. The reference element can be chosen from any of the detection elements in the rock matrix (i.e., any element that contributes to the measured spectrum). Typically, it will be calcium in a carbonate formation and silicon in a sandstone formation, but it could be any element if its concentration is high enough. While the relationship is expressed in terms of elemental count rate, because the elemental yield ($y_j$) is the elemental count rate ($CR_j$) divided by the total spectral count rate ($CR_{tot}$), Equation 4 can also be expressed in terms of elemental yields as opposed to count rate. In addition, it could also be based on total counts in a given amount of time.

Below is the derivation of the compound weight fraction equation based on the relationship specified in Equation 4. This derivation is based on assuming that the elemental count rate(s) are each from one compound containing that element. First, Equation 4 is rearranged to give:

$$CR_j = \omega_j \frac{CR_{ref}}{N_{ref}} N_j \qquad \text{Eq. 8}$$

Equation 8 can be restated in terms of the number density of the detection element's associated compound as opposed to elemental number density as:

$$CR_j = \omega_j \frac{CR_{ref}}{N_{ref}} \eta_{j,k} N_k \qquad \text{Eq. 9}$$

where $\eta_{j,k}$=number of atoms of element j in compound k (e.g., 1 Ca in CaCO$_3$, 2 Al in Al$_2$O$_3$, etc.);

$N_k$=number density of compound k; and $CR_j$ is understood to be the elemental count rate from element j which is only in compound k.

It is traditional in nuclear physics to express atom number densities in terms of barn-cm, where 1 barn is equal to $10^{-24}$ cm$^2$ because Avagradro's number is $0.6022 \times 10^{24}$. In that way, the number densities in 1/b-cm are easier to use in any math equations. The number density of the compound can be defined (in terms of molecules per barn-cm) as:

$$N_k = \frac{0.6022 \cdot \rho \cdot WF_k}{A_k} \quad \text{Eq. 10}$$

where $\rho$=density of formation matrix (dry);

$A_k$=atomic mass of compound k;

$WF_k$=weight fraction of compound k; and 0.6022 comes from Avogadro's number divided by $10^{24}$ b/cm$^2$.

Substituting Equation 10 into Equation 9 yields:

$$CR_j = \omega_j \frac{CR_{ref}}{N_{ref}} \eta_{j,k} \frac{0.6022 \cdot \rho \cdot WF_k}{A_k} \quad \text{Eq. 11}$$

Rearranging Equation 11 yields:

$$WF_k = \frac{CR_j}{\omega_j} \frac{1}{\left(\frac{CR_{ref}}{N_{ref}}\right)} \frac{A_k}{\eta_{j,k} \cdot 0.6022 \cdot \rho} \quad \text{Eq. 12}$$

In a carbonate formation, calcium carbonate (CaCO$_3$) would typically be chosen as the reference compound. In such an example, Equation 12 can be expressed as:

$$WF_{CaCO_3} = \frac{CR_{Ca}}{\omega_{Ca}} \frac{1}{\left(\frac{CR_{ref}}{N_{ref}}\right)} \frac{A_{CaCO_3}}{\eta_{Ca} \cdot 0.6022 \cdot \rho} \quad \text{Eq. 13}$$

The ratio of the weight fraction of any given compound to the weight fraction of calcium carbonate is:

$$\frac{WF_k}{WF_{CaCO_3}} = \frac{\dfrac{CR_j}{\omega_j} \dfrac{1}{\left(\frac{CR_{ref}}{N_{ref}}\right)} \dfrac{A_k}{\eta_{j,k} \cdot 0.6022 \cdot \rho}}{\dfrac{CR_{Ca}}{\omega_{Ca}} \dfrac{1}{\left(\frac{CR_{ref}}{N_{ref}}\right)} \dfrac{A_{CaCO_3}}{\eta_{Ca} \cdot 0.6022 \cdot \rho}} \quad \text{Eq. 14}$$

Equation 14 is simplified to get:

$$\frac{WF_k}{WF_{CaCO_3}} = \frac{CR_j}{CR_{Ca}} \frac{\dfrac{1}{\omega_j} \dfrac{A_k}{\eta_{j,k}}}{\dfrac{1}{\omega_{Ca}} \dfrac{A_{CaCO_3}}{\eta_{Ca}}} \quad \text{Eq. 15}$$

Equation 15 is rearranged to yield:

$$WF_k = WF_{CaCO_3} \left(\frac{CR_j}{CR_{Ca}}\right) \frac{\dfrac{1}{\omega_j} \dfrac{A_k}{\eta_{j,k}}}{\dfrac{1}{\omega_{Ca}} \dfrac{A_{CaCO_3}}{\eta_{Ca}}} \quad \text{Eq. 16}$$

Because the sum of all compound weight fractions is equal to one, from Equation 16:

$$WF_{CaCO_3} \sum_{m=1}^{c} \left(\frac{CR_m}{CR_{Ca}}\right) \frac{\dfrac{1}{\omega_j} \dfrac{A_m}{\eta_{j,m}}}{\dfrac{1}{\omega_{Ca}} \dfrac{A_{CaCO_3}}{\eta_{Ca}}} = 1 \quad \text{Eq. 17}$$

where c=number of compounds in the model and m is the compound.

Dividing the right side of Equation 16 by the left side of Equation 17 (which is equal to one as expressed in Equation 17), yields:

$$WF_k = \frac{WF_{CaCO_3} \left(\dfrac{CR_j}{CR_{Ca}}\right) \dfrac{\frac{1}{\omega_k} \frac{A_k}{\eta_{j,k}}}{\frac{1}{\omega_{Ca}} \frac{A_{CaCO_3}}{\eta_{Ca}}}}{WF_{CaCO_3} \sum_{m=1}^{c} \left(\dfrac{CR_m}{CR_{CA}}\right) \dfrac{\frac{1}{\omega_m} \frac{A_m}{\eta_{j,m}}}{\frac{1}{\omega_{Ca}} \frac{A_{CaCO_3}}{\eta_{Ca}}}} \quad \text{Eq. 18}$$

Equation 18 can be simplified to yield:

$$WF_k = \frac{\dfrac{CR_j}{\omega_k \eta_{j,k}} A_k}{\sum_{m=1}^{c} \dfrac{CR_m}{\omega_m \eta_{j,m}} A_m} \quad \text{Eq. 19}$$

It is important to reiterate an earlier assumption, namely, that $CR_j$ is understood to be the elemental count rate from element j which is only in compound k. For the denominator above, we sum over every compound and we use the subscript m to identify the compound. So in the denominator in Eq. 19, the value $CR_m$ is the count rate from the detection element that is in compound m. Therefore, if m is the compound SiO$_2$, then $CR_m = CR_{Si}$ because silicon is assumed to only be in SiO$_2$. Likewise, if the compound m is CaCO$_3$, then $CR_m$ in the denominator is equal to $CR_{Ca}$. Note that Eq. 19 could be written to sum over all the elements, and while the subscripts would be different, the end mathematical result after performing the summation would be the same.

Thus, the weight fraction of each formation compound can be calculated based on the number density ratio of the compound's associated detection element. As mentioned earlier, the $CR_j$ is the elemental count rate for element j which is assumed to come only from compound k. Because an elemental yield can be determined from $CR_j/CR_{total}$, the above equation can also be expressed in terms of elemental yields $y_j$ as:

$$WF_k = \frac{\frac{y_j}{\omega_k \eta_{j,k}} A_k}{\sum_{m=1}^{c} \frac{y_m}{\omega_m \eta_{j,m}} A_m} \qquad \text{Eq. 20}$$

The compound weight fractions can be calculated directly from the elemental count rates using the known constant values in Equation 19 without the need to adjust for depth-specific properties using a normalization factor. It should be evident from the above description that the present technique is not based on relative yields, relative elemental standards, or the normalization factor F that is necessary for determining the relative elemental compositions of the rock matrix in current techniques. An important aspect of this disclosure is the inventors' determination that the detection element's number density ratio value, $\omega_j$, is constant, which is key to the elimination of the normalization factor F and the variations in the elemental compositions due to borehole effects.

Figure 9:
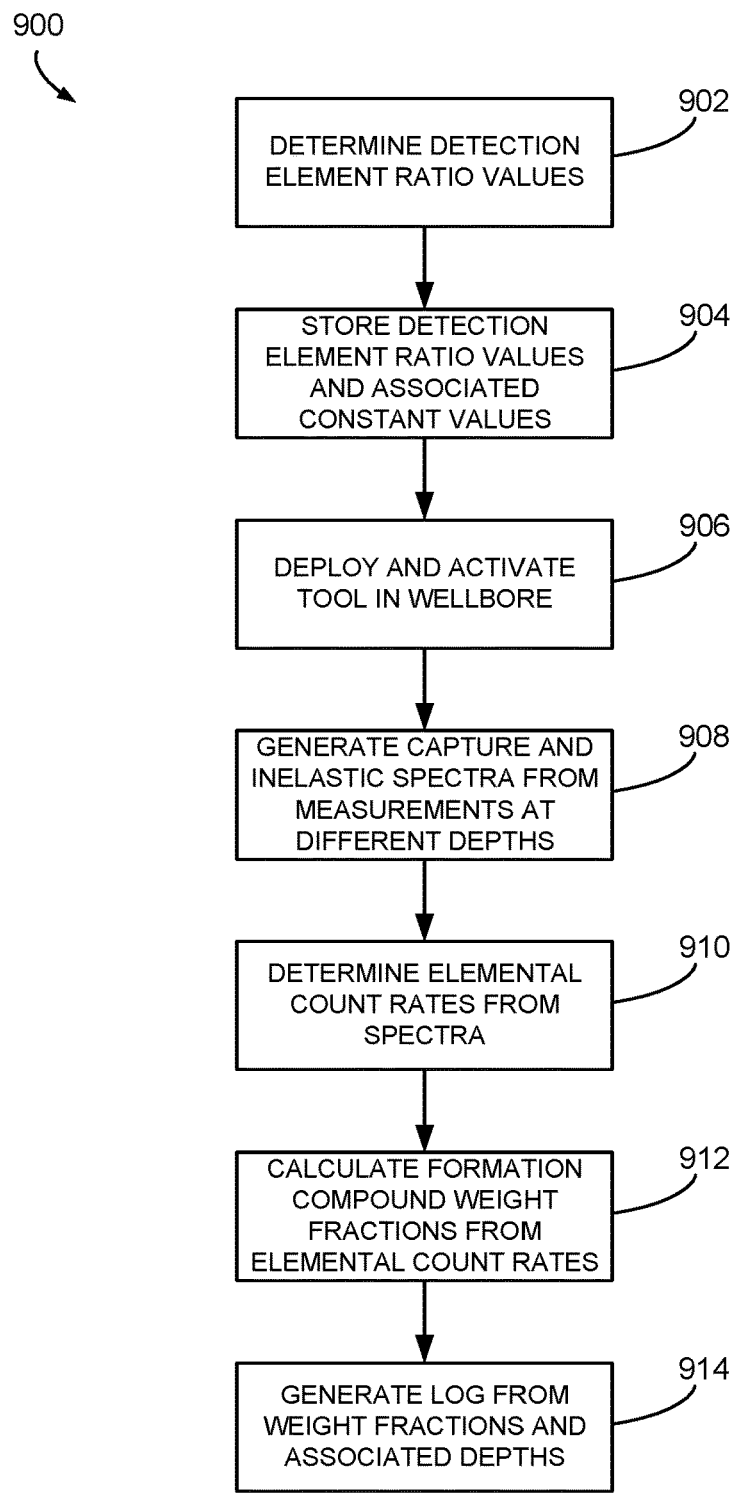
FIG. 9 is a flowchart that illustrates a process for determining formation compound weight percentages directly from the elemental count rates determined from spectra generated by the neutron logging tool in accordance with an embodiment of the disclosure.

FIG. 9 is a flow diagram that illustrates a process 900 for using the above equation for determining formation compound weight fractions. Initially, the ratio of each detection element's elemental count rate per number density to a reference element's elemental count rate per number density ($\omega_j$, or number density ratio value) is determined (step 902). These values can be determined, for example, as the average values observed through Monte Carlo analysis of example formations that contain the elements of interest. It is possible to calculate all of the data in one Monte Carlo simulation. However, more typically a set of formations will be modeled with only a few elements in the formation. In this case, at least one of the elements has to be common in two of the formations so that the number density ratio can be determined. Typically, the elements will be modeled in a limestone or sandstone formation, and thus the common element will be calcium or silicon, respectively. Alternatively, the values could be calculated experimentally from analyses of actual formation samples. It should be noted that, while the number density ratio values may be similar across different tools (at least in terms of a detection element's number density ratio value to another detection element's number density ratio value), the actual values are tool-specific as they relate to the particular tool's sensitivity in detecting the various elements. Moreover, the number density ratio values are specific to a particular interaction spectrum. Thus, an element contributing to both the capture and inelastic spectra (e.g., silicon) will have different number density ratio values for each spectrum. As noted above, any detection element can be selected as the reference element. However, each detection element's number density ratio should be calculated on the basis of the same reference element. By definition, the number density ratio of the selected reference element will be equal to one.

The number density ratio values that are determined for the tool 100, along with the associated constant values in Equation 19 (e.g., $\eta_{j,k}$ and $A_k$), are stored in a non-transitory computer-readable medium (step 904). The computer readable medium is typically associated with (i.e., readable by) the processing system 112 that is configured to receive signals from the tool 100. However, the computer-readable medium might also be associated with the tool 100 itself. For example, the computer-readable medium may be a memory resident in the tool 100, such as memory 254. The table below shows example parameters, including detection element capture spectrum number density ratio values based on both calcium (second row) and silicon (third row) references for an example tool 100, for several common detection elements. In this table, j is the detection element and k is the compound, and the earlier assumption that there is one and only one detection element per compound applies.

|  | Magnesium | Aluminum | Silicon | Sulfur | Potassium | Calcium | Iron |
|---|---|---|---|---|---|---|---|
| $\omega_j$ (Ca as ref) | 0.1483 | 0.4613 | 0.3828 | 1.1797 | 3.7749 | 1 | 4.3524 |
| $\omega_j$ (Si as ref) | 0.3887 | 1.2351 | 1 | 3.0546 | 9.8023 | 2.5944 | 11.3021 |
| Compound k | MgCO$_3$ | Al$_2$O$_3$ | SiO$_2$ | SO$_3$ | K$_2$O | CaCO$_3$ | Fe$_2$O$_3$ |
| Element j in compound k | Mg | Al | Si | S | K | Ca | Fe |
| $\eta_{j,k}$ | 1 | 2 | 1 | 1 | 2 | 1 | 2 |
| $A_k$ | 84.331 | 101.96 | 60.09 | 80.066 | 94.2 | 100.091 | 159.7 |

Note that the ratio of any two elements for a given reference element is the same. For example, when the reference element is Ca, the Si/Ca ratio is 0.3828/1.0=0.3828. In comparison, when Si is the reference element, the Si/Ca ratio is 1/2.5944=0.3854 (essentially the same value within the precision of the Monte Carlo simulations used to calculate them). Another example is K and S. For Ca as the reference, the ratio of K to S is 3.7749/1.1797=3.200. For Si as the reference element, the K to S ratio is 9.8023/3.0546=3.209 (essentially the same value). In summary, it makes no difference which reference element is selected because the $\omega_j$'s appear in both the numerator and denominator of Eqns. 19 and 20 and any normalization cancels out.

The stored values can then be utilized in conjunction with measurements collected by the tool 100 to calculate formation compound weight fractions directly (i.e., without adjustment for depth-specific properties). In the same manner as described above, the tool 100 is deployed in a wellbore 104 and activated (step 906). Detected gamma radiation is processed as described above to generate capture and inelastic spectra at each of multiple depths along the wellbore 104 (step 908). In one embodiment, the generated spectra are transmitted to the surface (e.g., by wireline 108) soon after they are generated. In an alternate embodiment, the generated spectra are stored by the tool 100 (e.g., in the tool 100's memory 254) until the tool 100 is retrieved from the wellbore 104. In such an embodiment, the stored spectra may be transferred to a system such as processing system 112 for further processing after the tool 100 is retrieved. In yet another embodiment, the formation compound weight fraction processing described below may be performed by the tool 100, and therefore the generated spectra may not be transmitted at all (e.g., the tool 100 may perform steps 910, 912, and/or 914).

As set forth above, the inelastic and capture spectra generated at each particular depth are utilized to determine the elemental count rates for each of the detection elements (step 910). The calculated elemental count rates are then utilized in conjunction with the stored values to determine the formation compound weight fractions using the relationship specified in Equation 19 (step 912). By way of example, if only calcium and magnesium are observed in a measured capture spectrum, and their elemental count rates are measured as 4600 and 5400, respectively, the elemental count rates can be utilized to calculate the weight fractions of calcium carbonate and magnesium carbonate as shown below:

$$WF_{CaCO_3} = \frac{\left[\frac{4600}{1*1}(100.091)\right]}{\left[\frac{4600}{1*1}(100.091)\right] + \left[\frac{5400}{0.1483*1}(84.331)\right]} = 0.1304$$

$$WF_{MgCO_3} = \frac{\left[\frac{5400}{0.1483*1}(84.331)\right]}{\left[\frac{4600}{1*1}(100.091)\right] + \left[\frac{5400}{0.1483*1}(84.331)\right]} = 0.8696$$

This example is assuming that calcium is the reference element. Therefore, the determined elemental count rates correspond to a formation having a calcium carbonate weight fraction of approximately 13% and a magnesium carbonate weight fraction of approximately 87%. Similar results would be obtained if silicon (or in fact any element) was the reference element. While this simple example includes only two formation compounds, the equations remain accurate for formations having any number of constituent compounds. Moreover, as noted above, the equations do not depend on formation porosity, formation or borehole salinity, or borehole size and therefore do not require use of a depth-dependent normalization factor in order to calculate formation compound weight fractions. Steps 908-912 (e.g., generating gamma spectra, determining a contribution of detection elements to the gamma spectra, and calculating weight fractions of the compounds associated with the detection elements) can be repeated for radiation observed at different depths along the wellbore to generate a wellbore log (step 914).

The calculations of formation compound weight fractions might typically be performed by the processing system 112, but they might also be performed by the tool 100 itself. The calculated formation compound weight fractions are stored along with corresponding depth values. The set of formation compound weight fractions over a range of depths can be utilized to generate a log as is known in the art. Such a log provides valuable information regarding the formation properties (and changes in formation properties) at different depths along a wellbore.

FIG. 10 illustrates an example processing system 112. Representative system 112 includes processor 1005, memory 1010, storage 1015, graphics hardware 1020, communication interface 1025, user interface adapter 1030 and display adapter 1035—all of which may be coupled via system bus or backplane 1040. Memory 1010 may include one or more different types of media (typically solid-state) used by processor 1005 and graphics hardware 1020. For example, memory 1010 may include memory cache, read-only memory (ROM), and/or random access memory (RAM). Storage 1015 may store media, computer program instructions or software, preference information, device profile information, and any other suitable data. Storage 1015 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), Electrically Erasable Programmable Read-Only Memory (EEPROM), and USB or thumb drive. Memory 1010 and storage 1015 may be used to tangibly retain computer program instructions or code organized into one or more modules and written in any desired computer programming language. When executed by processor 1005 and/or graphics processor 1020 such computer program instructions may implement one or more of the processes described herein (e.g., portions of process 900). In addition, the computer program instructions may store values related to such processes (e.g., the values described with respect to step 904 of process 900). Communication interface 1025 may be used to enable communications with the tool 100 and/or to connect system 112 to a network. Communications directed to system 112 may be passed through protective firewall 1075. Such communications may be interpreted via web interface 1080 or voice communications interface 1085. Illustrative networks include, but are not limited to: a local network such as a USB network or a local connection to the tool 100; a business' local area network; or a wide area network such as the Internet. User interface adapter 1030 may be used to connect keyboard 1045, microphone 1050, pointer device 1055, speaker 1060 and other user interface devices such as a touch-pad and/or a touch screen (not shown). Display adapter 1035 may be used to connect display 1065 and printer 1070.

Processor 1005 may include any programmable control device. Processor 1005 may also be implemented as a custom designed circuit that may be embodied in hardware devices such as application specific integrated circuits (ASICs) and field programmable gate arrays (FPGAs). System 112 may have resident thereon any desired operating system.

While the invention herein disclosed has been described in terms of specific embodiments and applications thereof, numerous modifications and variations could be made thereto by those skilled in the art without departing from the scope of the invention set forth in the claims.

What is claimed is:

1. A method for determining a composition of an earth formation, comprising:
    generating one or more spectra from gamma radiation that is detected in a wellbore;
    determining a contribution of each of a plurality of detection elements to the generated one or more spectra;
    for each of the detection elements, determining the detection element's count rate per number density;
    designating one of the detection elements as a reference element;
    for each of the detection elements, determining a number density ratio value ($\omega_j$) as a ratio of the element's count rate per number density to the reference element's count rate per number density; and
    calculating a weight fraction of each of a plurality of compounds, each compound comprising at least one of the plurality of detection elements, wherein each weight fraction is calculated based on a number density ratio value for the detection element in the compound.

2. The method of claim 1, wherein the one or more spectra comprise an inelastic spectrum and a capture spectrum.

3. The method of claim 2, wherein the inelastic spectrum is generated based on gamma radiation that is detected within a first time period after a beginning of a neutron pulse and the capture spectrum is generated based on gamma radiation that is detected within a second time period after the beginning of the neutron pulse.

4. The method of claim 1, wherein the acts of generating, determining, and calculating are repeated for gamma radiation that is detected at each of a plurality of depths within the wellbore.

5. The method of claim 4, further comprising generating a wellbore log based on the calculated weight fractions at the plurality of depths within the wellbore.

6. The method of claim 1, wherein each of the one or more spectra specifies a quantity of the detected gamma radiation that is within each of a plurality of energy ranges.

7. The method of claim 1, wherein determining the contribution of each of the plurality of detection elements to the generated one or more spectra comprises determining a linear combination of elemental spectra that correspond to the plurality of detection elements that most closely matches the generated one or more spectra.

8. The method of claim 7, wherein the gamma radiation is detected by a neutron logging tool that is conveyed in the wellbore, and wherein the elemental spectra are determined experimentally based on measurements by the tool of a plurality of samples, wherein each of the plurality of samples substantially includes a single one of the plurality of detection elements.

9. The method of claim 1, wherein the weight fraction of each of the plurality of compounds is calculated as a first ratio for the compound divided by a sum of the first ratios for the plurality of compounds, wherein the first ratio for each compound is calculated as a product of the elemental count rate of the compound's associated detection element and an atomic mass of the compound divided by the product of the number density ratio value for the compound's associated detection element and a number of atoms of the detection element in the compound.

10. The method of claim 1, wherein the number density ratio value for one or more of the plurality of detection elements is determined through an analysis of one or more samples.

11. The method of claim 1, wherein the number density ratio value for one or more of the plurality of detection elements is determined through one or more Monte Carlo simulations.

* * * * *